Oct. 16, 1945.    S. F. WARNER    2,386,760
PULSE CONTROLLING APPARATUS
Filed Aug. 18, 1942
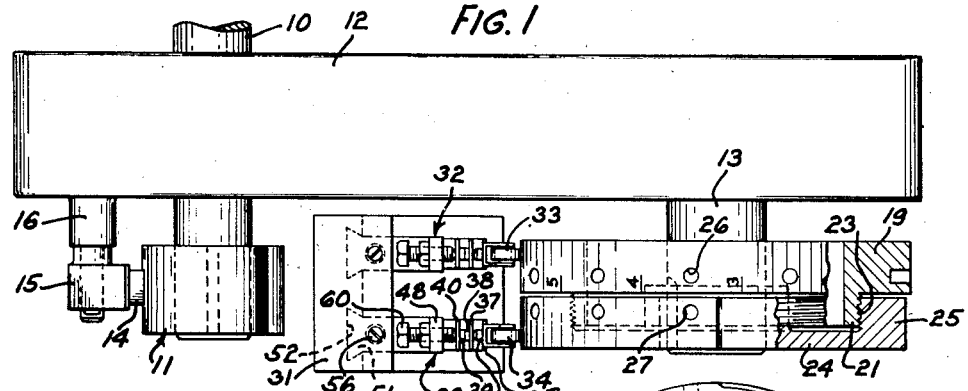
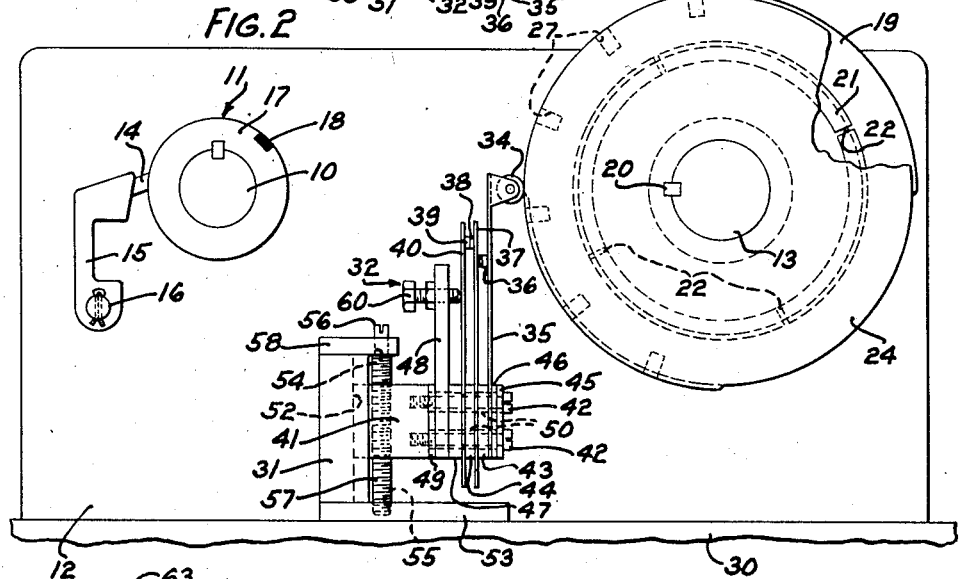
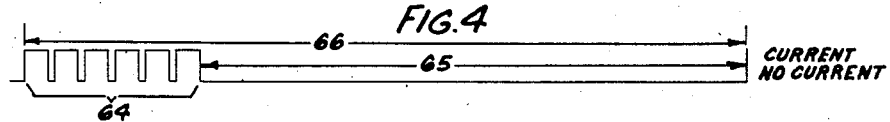
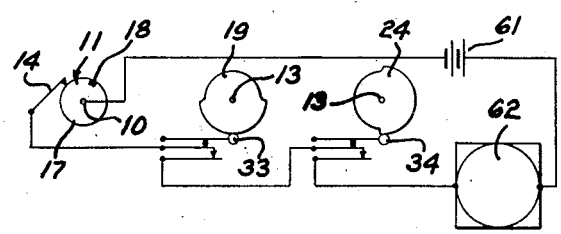
INVENTOR
S. F. WARNER
BY Harry L. Duft
ATTORNEY Patented Oct. 16, 1945

2,386,760

UNITED STATES PATENT OFFICE 2,386,760

PULSE CONTROLLING APPARATUS

Stanley F. Warner, Forest Park, Ill., assignor to Western Electric Company, Incorporated, New York, N. Y., a corporation of New York Application August 18, 1942, Serial No. 455,255

7 Claims. (Cl. 179—175.2)

This invention relates to pulse controlling apparatus and more particularly to an apparatus for selecting a predetermined number of pulses generated by a pulse generator in continuous succession.

It is an object of the present invention to provide a simple and efficient apparatus whereby a desired number of pulses may be selected from a group of pulses generated in automatic succession.

In accordance with one embodiment of the invention, a pulse generator which may be utilized in testing electrical equipment, for example, telephone switching apparatus, is provided for generating electrical impulses in automatic succession with a relatively short interval between the pulses so that apparatus connected thereto may be tested at relatively high speed. This generator, which is of a well-known type, is adapted to generate a succession of pulses and in order to select various numbers of pulses for use, must be provided with some type of selecting mechanism for selecting the pulses to be utilized in the testing operations. Accordingly, the apparatus constituting the present invention is connected to such a generator at a predetermined gear ratio and includes a shaft driven in timed relation to the pulse generator's operation on which shaft a pair of cooperating cam discs are mounted, one of the discs being keyed directly to the shaft and the other disc being frictionally engaged with the first-mentioned disc. The cams may be adjusted relative one to another to control suitable contactors for interrupting the circuit from the pulse generator and the contactors are arranged to be micrometrically adjusted toward or away from the cams and up and down whereby the time of making and breaking of the circuit may be closely adjusted.

A better understanding of the invention may be had by reference to the accompanying drawing, wherein:

Fig. 1 is a plan view of a pulse generator equipped with the selecting mechanism of the present invention, parts of the selecting mechanism being broken away to illustrate more clearly details of construction thereof;

Fig. 2 is a side elevational view of the apparatus shown in Fig. 1;

Fig. 3 is a graphic illustration of the pulses generated by the pulse generator;

Fig. 4 is a graphic illustration of the number of effective pulses generated by the pulse generator as selected by the selecting mechanism; and Fig. 5 is a circuit schematic illustrating the electrical connections between the pulse generator and the selecting mechanism.

Referring to the drawing, wherein like reference characters designate the same parts throughout the several views, particular reference being had to Figs. 1 and 2, drive shaft 10 is provided for driving a pulsing drum 11 at a predetermined speed. The drive shaft 10 extends through a suitable gear case 12 containing gearing (not shown) for interconnecting the shaft 10 with a selector shaft 13. Associated with the pulsing drum is a contactor 14 mounted upon the end of a lever 15 and urged into engagement with the surface of the pulsing drum in any suitable manner. The lever 15 is pivoted on the stud shaft 16 and holds the contactor 14 against the face of the drum 11, which is provided with conducting and non-conducting areas 17 and 18. The contactor 14 and lever 15 are suitably insulated from the remainder of the machine and the only electrical contact between the shaft 10 and the contactor 14 occurs when the contactor 14 is in engagement with the conducting portion 17 of the drum 11.

The shaft 13 has a cam 24 keyed to it by means of a key 20 so that the cam 24 will always be driven by the shaft 13 and will remain fixed with respect to the shaft 13 during the rotation thereof. A cam 19 is provided having a forwardly extending annular projection 21, which is slotted, as shown at 22—22 and provided with external threads 23 for cooperation with an annular shoulder 25 on the cam 24 that is threaded internally to receive the external thread 23 formed on the annular projection 21 of the cam 19. The annular projection 21 and shoulder 25 are so proportioned that the external thread 23 on the projection 21 will tightly grip the internally threaded shoulder 25 on the cam 24 so that in the operation of the apparatus the cam 24 will be driven by the cam 19 but may be adjusted with respect to the cam 19 by inserting the lugs of spanner wrenches (not shown) in apertures 26 and 27 in the cams 19 and 24. By properly adjusting the cams 19 and 24 with respect one to another, the high and low portions of the cams may be adjusted, as most clearly illustrated in Fig. 5, so that the matching high portions of the cams will extend through any desired number of degrees from 0 to 180°.

The gear case 12 is mounted upon a suitable base member 30, which also supports a contactor supporting bracket 31. Mounted in the contactor supporting bracket 31 are a pair of contactor assemblies 32—32 of identically the same construction for carrying contact operating rollers 33 and 34 in engagement with the cams 19 and 24, respectively. Only the contactor assembly 32 which carries the contact operating roller 34 will be described in detail since the two assemblies are of exactly the same construction. The contact operating roller 34 is mounted upon the end of a leaf spring 35 which carries a contact actuator 36 of insulating material intermediate its ends for engaging and actuating contact spring 37 which, in turn, carries a contact 38 in position to engage a contact 39 on a cooperating contact spring 40. The springs 35, 37 and 40 are mounted on a block 41 by means of screws 42—42, insulators 43 and 44 being interposed between the springs 35 and 37 and 37 and 40, respectively. In addition to the insulators 43 and 44, a pair of insulators 45 and 46 are provided for suitably insulating the heads of the screws 42—42 from the spring 35 and an insulator 47 is provided for insulating the spring 40 from the adjustment plate 48, which is, in turn, insulated from the block 41 by an insulator 49. The apertures in the insulators 45, 46, 43, 44, 47 and 49 and in the springs 35, 37 and 40 and the adjustment plate 48 are appreciably larger than the shanks of the screws 42 so that a pair of tubular insulators 50—50 may be passed through the apertures and thus the assembly of the adjustment plate and the various springs may be rigidly mounted upon but insulated from the block 41.

The left end of the block 41, as seen most clearly in Fig. 1, is dove-tailed, as shown at 51, in a dove-tail slot 52 formed in the contactor supporting bracket 31 for vertical movement in the bracket 31. The bracket 31 includes, in addition to the upright member designated 31, a top plate 58 and a base plate 53, in which an aperture 54 and a socket 55, respectively, are formed for receiving the upper reduced portion 56 and lower end of an adjustment screw 57, which threadedly engages the block 41 and may be rotated to adjust the height of the block 41 and the consequent vertical position of the contact operating roller 34. By adjusting the vertical position of the block 41, the contact roller 34 may be moved up or down and its position relative to the cam 24 may thereby be micrometrically adjusted to control within very close limits the time at which the cam 24 will, through its movement of the roller 34, move the contact 38 into engagement with the contact 39.

In addition to being adjustable vertically, a further micrometric adjustment of the position of the contact spring 40 may be effected through a set screw 60, which is threaded into the adjustment plate 48 and abuts the spring 40. By adjusting the set screw 60, the gap between the contacts 38 and 39 may be very closely adjusted and the consequent time of closure of the contacts may be regulated.

As illustrated diagrammatically in Fig. 5, the cams 19 and 24 have been adjusted so that they will maintain their associated contacts closed concurrently for approximately 90° of their rotation and if it be assumed that the pulsing drum 11 and the cams 19 and 24 are rotating in a clockwise direction with the pulsing drum travelling at twenty-four times the speed of the cams 19 and 24 due to the gearing between the shafts 10 and 13, twenty-four pulses will be generated for each complete rotation of the cams 19 and 24 by the pulsing drum 11 connecting battery at 61 through its conducting area 17 to the contactor 14 and one-fourth or six pulses will be transmitted through the contacts associated with the cams 19 and 24 to a test circuit indicated generally by the numeral 62 (Fig. 5). The initiation of the selection of pulses will be controlled by the cam 24 and the interruption of the pulses will be controlled by the cam 19. Therefore, it is possible to so adjust the position of the cams 19 and 24 with respect to each other that any number of pulses from one to twelve may be selected from any sequence of twenty-four pulses generated by the pulsing drum 11 and its cooperating contactor 14. Since the non-conducting area 18 of the pulsing drum 11 is relatively small with respect to the conducting area 17 thereof as indicated graphically at 63 in Fig. 3 and it is highly desirable that the pulsing circuit to the test circuit 62 be broken at a time when there is no current flowing from battery 61, the contactor assemblies 32 may be individually adjusted vertically by means of the adjustment screw 57 and then the position of the contact spring 40 may be adjusted with respect to the contact spring 37 by means of the screw 60, thereby to cause the contact between contacts 38 and 39 to be both made and broken at a no-current interval of the pulsing drum.

In Fig. 3, there has been illustrated diagrammatically the time when the pulsing drum 11 and its associated contactor 14 will be effective to supply current and when they will not be effective to supply current and it will be noted that the time interval when no current is connected between the pulsing drum 11 and the contactor 14 is relatively short. At this interval, the continuation of the pulsing circuit to the test circuit 61 should be made and interrupted. This may be done by properly adjusting the position of the contacts 38 and 39 in each of the contactor assemblies 32 so that any number of pulses from 1 to 12 which have been selected by adjusting the cams 19 and 24 with respect to each other may be directed to the test circuit 62 and the remainder of the pulse generating cycle may be utilized for other purposes in the test circuit 62.

In Fig. 4, the six pulses selected, by adjusting the cams 19 and 24 in the manner illustrated in Fig. 5, are shown at 64, the idle or no-current portion of a complete cycle is indicated at 65 and the entire cycle of twenty-four pulse periods is indicated at 66.

What is claimed is:

1. The combination with a pulse generator emitting pulses in continuous automatic succession of means for completing a series connection from said generator to select a predetermined number of pulses in a predetermined period comprising a pair of relatively adjustable and rotatably driven contact controlling cams, a pair of contactors adjustable tangentially with respect to said cams for completing the said series connection, and means for adjusting one contact of each of a pair of contactors with respect to its associated contact in the contactor.

2. The combination of a pulse generator with apparatus for selecting a predetermined number of pulses from a group for use comprising contact pairs in series with the pulse generator, a cam associated with each contact pair for determining the length of time the pairs of contacts are closed, means for adjustably interconnecting said cams to select the relative time of closure of their associated contact pairs including an internally threaded annular shoulder formed on one cam, and an externally threaded split annular shoulder formed on the other cam for threadedly and resiliently engaging the internally threaded shoulder on the one cam.

3. The combination of a pulse generator with apparatus for selecting a predetermined number of pulses from a group for use comprising contact pairs in series with the pulse generator, a cam associated with each contact pair for determining the length of time the pairs of contacts are closed, and means for individually adjusting said contact pairs wtih respect to their cams for selecting the time in a single pulse cycle at which the contact pair will close and open including means for moving a contact of each contact pair radially of its associated cam.

4. The combination of a pulse generator with apparatus for selecting a predetermined number of pulses from a group for use comprising contact pairs in series with the pulse generator, a cam associated with each contact pair for determining the length of time the pairs of contacts are closed, and means for individually adjusting said contact pairs with respect to their cams for selecting the time in a single pulse cycle at which the contact pair will close and open including a threaded member for supporting a contact pair adjacent its cam and for moving the contact pair tangentially of its cam.

5. The combination of a pulse generator with apparatus for selecting a predetermined number of pulses from a group for use comprising contact pairs in series with the pulse generator, a cam associated with each contact pair for determining the length of time the pairs of contacts are closed, and means for individually adjusting said contact pairs with respect to their cams for selecting the time in a single pulse cycle at which the contact pair will close and open including a contactor supporting bracket fixed with respect to the axis of the cams, a block slidable with respect to said bracket and having said contact pairs attached thereto, and means carried by said block for adjustably positioning one member of the contact pair with respect to the other.

6. The combination of a pulse generator with apparatus for selecting a predetermined number of pulses from a group for use comprising contact pairs in series with the pulse generator, a cam associated with each contact pair for determining the length of time the pairs of contacts are closed, and means for individually adjusting said contact pairs with respect to their cams for selecting the time in a single pulse cycle at which the contact pair will close and open including a stationary contactor supporting bracket, a supporting block for supporting the contact pair and mounted on said bracket for sliding movement tangentially of the cams, and an adjustment screw rotatable with respect to said bracket and threadedly engaging said block to micrometrically adjust the block tangentially of the cams.

7. The combination of a pulse generator with apparatus for selecting a predetermined number of pulses from a group for use comprising contact pairs in series with the pulse generator, a cam associated with each contact pair for determining the length of time the pairs of contacts are closed, and means for individually adjusting said contact pairs with respect to their cams for selecting the time in a single pulse cycle at which the contact pair will close and open including a stationary contactor supporting bracket, a supporting block for supporting the contact pair and mounted on said bracket for sliding movement tangentially of the cams, an adjustment screw rotatable with respect to said bracket and threadedly engaging said block to micrometrically adjust the block tangentially of the cams, and a threaded member carried by the block for adjusting one member of the contact pair with respect to the other radially of the cam.

STANLEY F. WARNER.